(12) United States Patent
Vandam et al.

(10) Patent No.: US 12,412,263 B2
(45) Date of Patent: Sep. 9, 2025

(54) AUTOMATED DEFECT DETECTION (71) Applicant: Baker Hughes Oilfield Operations LLC, Houston, TX (US)

(72) Inventors: Jeremy Vandam, Edmond, OK (US); Sheldon McCrackin, Houston, TX (US); Samvid Jhaveri, Oklahoma City, OK (US); Braden Starcher, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 619 days.

(21) Appl. No.: 17/393,586

(22) Filed: Aug. 4, 2021

(65) Prior Publication Data

US 2022/0051395 A1 Feb. 17, 2022

Related U.S. Application Data

(60) Provisional application No. 63/063,995, filed on Aug. 11, 2020.

(51) Int. Cl.
*G06T 7/00* (2017.01)
*G01N 21/95* (2006.01)
(Continued)

(52) U.S. Cl.
CPC ........... *G06T 7/0006* (2013.01); *G01N 21/95* (2013.01); *G06T 7/11* (2017.01);
(Continued)

(58) Field of Classification Search
CPC ...... G01N 21/88; G01N 21/95; G01N 21/892; G01N 21/954; G01N 2021/9542;
(Continued)

(56) References Cited

U.S. PATENT DOCUMENTS

| 7,239,399 B2 * | 7/2007 | Duquette | H04N 13/207 |
| | | | 348/E13.005 |
| 7,385,710 B1 * | 6/2008 | Sturgill | G01B 11/06 |
| | | | 356/632 |

(Continued)

FOREIGN PATENT DOCUMENTS

| EP | 3460720 A1 * | 3/2019 | ........... F01D 21/003 |
| KR | 10-2012-0105149 A | 9/2012 | |

(Continued)

OTHER PUBLICATIONS

International Search Report of PCT/US2021/071150.

*Primary Examiner* — Manav Seth
(74) *Attorney, Agent, or Firm* — Mintz, Levin, Cohn, Ferris, Glovsky and Popeo, P.C.

(57) ABSTRACT

A method of nondestructive testing includes receiving data characterizing an image of an inspection region of an industrial machine acquired by an inspection device configured to inspect the inspection region. The inspection device includes a camera and a light source. The camera has a first position and a first orientation and the light source has a second position and a second orientation when the image is acquired. The method also includes identifying a defect in the inspection region of the industrial machine based on the received data characterizing the image of the inspection region. The method further includes determining that a new image of the inspection region needs to be acquired. The method also includes varying one or more of position of the camera, orientation of the camera, position of the light source and orientation of the light source.

13 Claims, 7 Drawing Sheets

(51) Int. Cl.
*G06T 7/11* (2017.01)
*G01N 21/88* (2006.01)

(52) U.S. Cl.
CPC ............... *G01N 2021/8809* (2013.01); *G01N 2021/8887* (2013.01); *G06T 2207/30164* (2013.01)

(58) Field of Classification Search
CPC ....... G01N 2021/8864; G01N 21/8851; G01N 21/8806; G01N 2021/8809; G01N 2021/8887; G06T 7/0002; G06T 7/0008; G06T 7/0004; G06T 2207/30108; G06T 2207/30164; G06T 7/0006; G06T 2207/10152; G06T 7/70; G06T 7/11; G06T 7/00; G06T 2207/10068; G05B 2219/32186; G05B 2219/31304; H04N 23/695; H04N 23/69; H04N 23/66; H04N 7/188; H04N 23/64; H04N 23/555
See application file for complete search history.

(56) References Cited

U.S. PATENT DOCUMENTS

| | | | | |
|---|---|---|---|---|
| 8,761,490 B2 * | 6/2014 | Scheid | ............... | G01N 21/8851 382/145 |
| 8,807,414 B2 * | 8/2014 | Ross | ............... | A61B 17/07207 227/175.3 |
| 8,858,425 B2 * | 10/2014 | Farr | ............... | A61B 90/37 600/110 |
| 8,866,891 B2 * | 10/2014 | Derrien | ............... | B25J 9/1697 348/50 |
| 8,923,650 B2 * | 12/2014 | Wexler | ............... | G06V 10/48 382/286 |
| 9,074,868 B2 * | 7/2015 | Bendall | ............... | G01B 21/042 |
| 9,412,189 B2 * | 8/2016 | Bendall | ............... | H04N 25/71 |
| 9,471,057 B2 * | 10/2016 | Scheid | ............... | F01D 21/003 |
| 9,513,635 B1 * | 12/2016 | Bethke | ............... | G05D 1/0094 |
| 9,528,908 B2 * | 12/2016 | Wilson | ............... | B08B 1/143 |
| 9,939,349 B2 * | 4/2018 | Mueller | ............... | F01D 21/003 |
| 10,054,552 B1 * | 8/2018 | Frutuoso | ............... | G01N 21/8806 |
| 10,083,616 B2 * | 9/2018 | Bauer | ............... | G08G 5/52 |
| 10,162,796 B2 * | 12/2018 | Coombs | ............... | H04N 23/695 |
| 10,682,038 B1 * | 6/2020 | Zhang | ............... | B25J 13/00 |
| 10,691,985 B2 * | 6/2020 | Lim | ............... | G06F 18/217 |
| 10,810,732 B2 * | 10/2020 | Dwivedi | ............... | G06T 7/13 |
| 11,023,770 B2 * | 6/2021 | Qiu | ............... | G06T 7/11 |
| 11,516,406 B2 * | 11/2022 | McCrackin | ............... | H04N 23/695 |
| 12,088,919 B2 * | 9/2024 | McCrackin | ............... | H04N 23/695 |
| 2002/0009220 A1 | 1/2002 | Tanaka | | |
| 2005/0085691 A1 * | 4/2005 | Nakao | ............... | A61B 1/0008 600/128 |
| 2006/0065844 A1 * | 3/2006 | Zelakiewicz | ............... | H04N 23/30 348/E5.042 |
| 2006/0189845 A1 * | 8/2006 | Maahs | ............... | A61B 1/0008 600/146 |
| 2007/0116351 A1 | 5/2007 | Duquette et al. | | |
| 2010/0239157 A1 | 9/2010 | O'Dell et al. | | |
| 2013/0085331 A1 * | 4/2013 | Ramamurthy | ............... | A61B 5/06 600/117 |
| 2013/0113914 A1 * | 5/2013 | Scheid | ............... | G01N 21/8851 348/82 |
| 2013/0192353 A1 * | 8/2013 | Hatcher | ............... | G02B 23/2484 73/112.01 |
| 2013/0317295 A1 * | 11/2013 | Morse | ............... | H04N 23/56 600/109 |
| 2019/0073760 A1 * | 3/2019 | Wang | ............... | G06T 7/001 |
| 2019/0272630 A1 * | 9/2019 | Inazumi | ............... | G06T 7/0008 |
| 2020/0175669 A1 * | 6/2020 | Bian | ............... | G06T 7/0004 |
| 2022/0395159 A1 * | 12/2022 | Atarot | ............... | G06T 7/0012 |
| 2023/0342902 A1 * | 10/2023 | Manafiazar | ............... | G06T 7/0002 |
| 2024/0338025 A1 * | 10/2024 | Everhard | ............... | G06T 7/0002 |

FOREIGN PATENT DOCUMENTS

| | | | | |
|---|---|---|---|---|
| WO | WO-03043400 A1 * | 5/2003 | ............ | H04N 13/207 |
| WO | 2013-151191 A1 | 10/2013 | | |
| WO | WO-2014105298 A1 * | 7/2014 | ............ | G01N 21/954 |

* cited by examiner

AUTOMATED DEFECT DETECTION

RELATED APPLICATION

This application claims priority under 35 U.S.C. § 119(e) to U.S. Provisional Patent Application No. 63/063,995 filed on Aug. 11, 2020, the entire content of which is hereby expressly incorporated by reference herein.

BACKGROUND

Video inspection devices, such as video endoscopes or borescopes, can be used to take depth measurements on an object (e.g., lowest points in anomalies such as pits or dents, heights of welds, measurements of offsets or clearances between surfaces, etc.). Additionally, video inspection devices can be used to observe defects (e.g., tears, cracks, scratches, etc.) on a surface of an object (e.g., an industrial machine). In many instances, the surface of the object is inaccessible and cannot be viewed without the use of the video inspection device. For example, a video inspection device can be used to inspect the surface of a blade of a turbine engine on an aircraft or power generation unit to identify any anomalies to determine if any repair or further maintenance is required. In order to make that assessment, it is often necessary to obtain highly accurate-dimensional measurements of the surface to verify that the anomaly does not fall outside an operational limit or required specification for that object.

SUMMARY

Various aspects of the disclosed subject matter may provide one or more of the following capabilities.

In one implementation, a method of nondestructive testing includes receiving data characterizing an image of an inspection region of an industrial machine acquired by an inspection device configured to inspect the inspection region. The inspection device includes a camera and a light source. The camera has a first position and a first orientation and the light source has a second position and a second orientation when the image is acquired. The method also includes identifying a defect in the inspection region of the industrial machine based on the received data characterizing the image of the inspection region. The method further includes determining that a new image of the inspection region needs to be acquired. The method also includes varying one or more of position of the camera, orientation of the camera, position of the light source and orientation of the light source.

One or more of the following features can be included in any feasible combination.

In one implementation, the method further includes determining one or more of a first target position of the camera, a first target orientation of the camera, a second target position of the light source and a second target orientation of the light source. In another implementation, the position of the camera is varied from the first position to the first target position and/or the orientation of the camera is varied from the first orientation to the first target orientation. In yet another implementation, the position of the light source is varied from the second position to the second target position and/or the orientation of the light source is varied from the second orientation to the second target orientation.

In one implementation, identifying the defect in the inspection region includes calculating a defect probability value associated with the defect in the inspection region. The calculation is based on comparison of the data characterizing the image with data characterizing images of inspection regions in a database. In another implementation, the determination that the new image of the inspection region needs to be acquired is made when the defect probability value is between a first threshold value and second threshold value.

An inspection system includes an inspection device comprising a camera and a light source and configured to inspect an inspection region of an industrial machine. The inspection system also includes a controller communicatively coupled to the inspection device. The controller is configured to receive data characterizing an image of the inspection region acquired by the inspection device. The camera has a first position and a first orientation and the light source has a second position and a second orientation when the image of the inspection region is acquired. The controller is also configured to identify a defect in the inspection region based on the received data characterizing the image of the inspection region. The controller is further configured to determine that a new image of the inspection region needs to be acquired, and vary one or more of position of the camera, orientation of the camera, position of the light source and orientation of the light source.

In one implementation, the controller executes an image recognition algorithm that determines that the new image of inspection region needs to be acquired based on a defect probability value. The image recognition algorithm calculates the defect probability value based on comparison of the data characterizing the image with data characterizing images of inspection regions in a database Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which.

DETAILED DESCRIPTION

Non-destructive testing (NDT) devices (e.g., borescopes) are commonly employed to inspect industrial equipment (e.g., power generation equipment, oil and gas equipment, aircraft equipment, manufacturing equipment, and the like). NDT devices can include one or more cameras that can be navigated inside the industrial equipment to an inspection region and acquire images thereof. The acquired image data can be communicated to a computing device (e.g., a controller) that can store/process the data, present the data to a human operator, etc. Inspection region images are generally viewed and analyzed by human operators who rely on their experience in identifying defects and/or determining the severity of the defects. This process can be slow, expensive and prone to error. Moreover, the identification/analysis of defects usually occurs after the inspection region image has been taken. If the inspection region image is undesirable (e.g., the defect or a characteristic thereof cannot be identified/analyzed), a new inspection region image may not be easily obtained. This application describes systems and methods for automatically detecting a defect in an inspection region image, determining whether a new inspection image is required and configuring the NDT device to acquire a new inspection region image.

Figure 1:
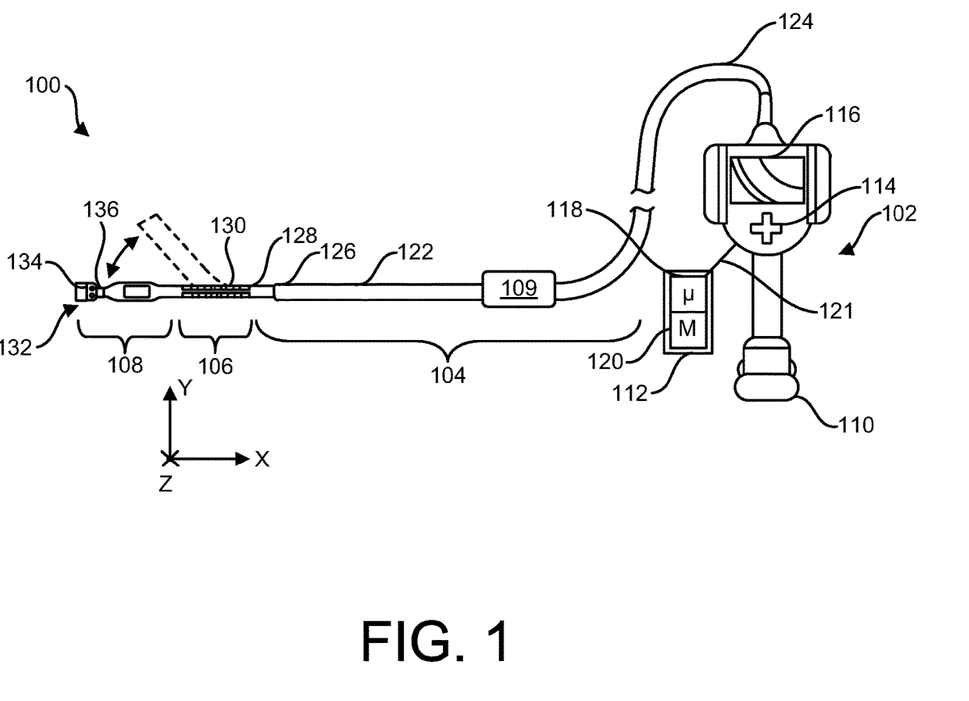
FIG. 1 illustrates a diagram illustrating of an exemplary embodiment of a nondestructive testing (NDT) device.

FIG. 1 is a diagram illustrating an exemplary embodiment of an NDT device in the form of a borescope 100. The borescope 100 includes a control unit 102, a conduit section 104, a bendable articulation section 106, and a head section 108. In one embodiment, the sections 104, 106, 108 can have different lengths and can be integral with one another, or can be detachable from one another. As depicted, the conduit section 104 is suitable for insertion into a variety of different targets, such as inside turbomachinery, equipment, pipes, conduits, underwater locations, curves, bends, inside or outside of an aircraft system, and the like.

The borescope 100 can include a probe driver 109 coupled to the conduit section 104. The probe driver 109 can include a motor (not shown) configured to translate and/or rotate one or more of the sections 104, 106, 108 (e.g., to facilitate insertion of the probe head 108 into the target). Additionally or alternatively, orientation/position of a portion of the head section 108 (e.g., camera, light source, etc.) can be varied to acquire an inspection region image (e.g., RGB image, IR image, etc.). The control unit 102 can include a control unit housing 110, a controller 112, a directional input 114, and a screen 116. The controller 112 can include a processor 118 and a readable memory 120 containing computer readable instructions which can be executed by the processor 118 in order to actuate the borescope 100.

The controller 112 can be communicatively coupled to the control unit 102 via one or more signals 121. The controller 112 can also be arranged within the control unit housing 110, or can be arranged outside the control unit housing 110. On some implementations, the directional input 114 can be configured to receive user input (e.g., direction controls) to the control unit 102 for actuation of the borescope 100. The screen 116 can display visual information being received by the camera (comprising an optical sensor) arranged in the head section 108, which can allow the user to better guide the borescope 100 using the directional input 114. The directional input 114 and the screen 116 can be communicatively coupled to the controller 112 via the one or more signals 121, which can be a hard-wired connection or a wireless signal, such as WI-FI or Bluetooth.

The conduit section 104 can include a tubular housing 122 including a proximal end 124 and a distal end 126. The tubular housing 122 can be a flexible member along its whole length, or can be rigid at the proximal end 124 and become more flexible travelling down the length of the conduit section 104 towards the distal end 126. In certain embodiments, the tubular housing 122 can be formed from a non-porous material to prevent contaminants from entering the borescope 100 via the conduit section 104.

The control unit 102 can be arranged at the proximal end 124 of the tubular housing 122, and the bendable articulation section 106 can be arranged at the distal end of the tubular housing 122. The bendable articulation section 106 can include a bendable neck 128 and washers 130. The bendable neck 128 can be arranged at the distal end 126 of the tubular housing 122, and is able to be actuated 360° in the Y-Z plane. The bendable neck 128 can be wrapped in a non-porous material to prevent contaminants from entering the borescope 100 via the bendable articulation section 106.

The head section 108 can include a head assembly 132. The head assembly 132 can include one or more light source 134 (e.g., LEDs or a fiber optic bundle with lights at the proximal end), a camera 136 (or multiple cameras), and one or more sensors that can be configured to collect data about the surrounding environment. The camera 136 of the borescope 100 can provide images and video suitable for inspection to the screen 116 of the control unit 102. The light source 134 can be used to provide for illumination when the head section 108 is disposed in locations having low light or no light. The sensor can record data including temperature data, distance data, clearance data (e.g., distance between a rotating element and a stationary element), flow data, and so on.

In certain embodiments, the borescope 100 includes a plurality of replacement head assemblies 132. The head assemblies 132 can include tips having differing optical characteristics, such as focal length, stereoscopic views, 3-dimensional (3D) phase views, shadow views, etc. Additionally or alternatively, the head section 108 can include a removable and replaceable portion of the head section 108. Accordingly, a plurality of the head sections 108, bendable necks 128, and conduit section 104 can be provided at a variety of diameters from approximately one millimeter to ten millimeters or more.

During use, the bendable articulation section 106 and the probe driver 109 can be controlled, for example, by the control inputs (e.g., relative control gestures, physical manipulation device) from the directional input 114 and/or control signals generated by the controller 112. The directional input can be a joystick, D-pad, touch pad, trackball, optical sensor, or a touchscreen over the screen 116. The directional input 114 can also be a similar device that is located outside the control unit housing 110 and connected by wire or wireless means. In particular, a set of control inputs can be used to control the bendable articulation section 106 and/or the probe driver 109. The bendable articulation section 106 can steer or "bend" in various dimensions, while the conduit section 104 can translate and/or rotate, using any combination of actuators and wires arranged within the control unit 102, to adjust the orientation (e.g., a positioning) of the head section 108. The actuators can be electric, pneumatic, or ultrasonically operated motors or solenoids, shape alloy, electroactive polymers, dielectric elastomers, polymer muscle material, or other materials. For example, the bendable articulation section 106 and the probe driver 109 can enable movement of the head section 108 in an X-Y plane, X-Z plane, and/or Y-Z plane. Indeed, the directional input 114 can be used to perform control actions suitable for disposing the head section 108 at a variety of angles, such as the depicted angle α. In this manner, the head section 108 can be positioned to visually inspect desired locations.

Once the head section 108 is in a desired position, the camera 136 can operate to acquire, for example, a stand-still visual image or a continuous visual image, which can be displayed on the screen 116 of the control unit 102, and can be recorded by the borescope 100. In embodiments, the screen 116 can be multi-touch touch screens using capacitance techniques, resistive techniques, infrared grid techniques, and the like, to detect the touch of a stylus and/or one or more human fingers. Additionally or alternatively, acquired visual images can be transmitted into a separate storage device for later reference.

Figure 2:
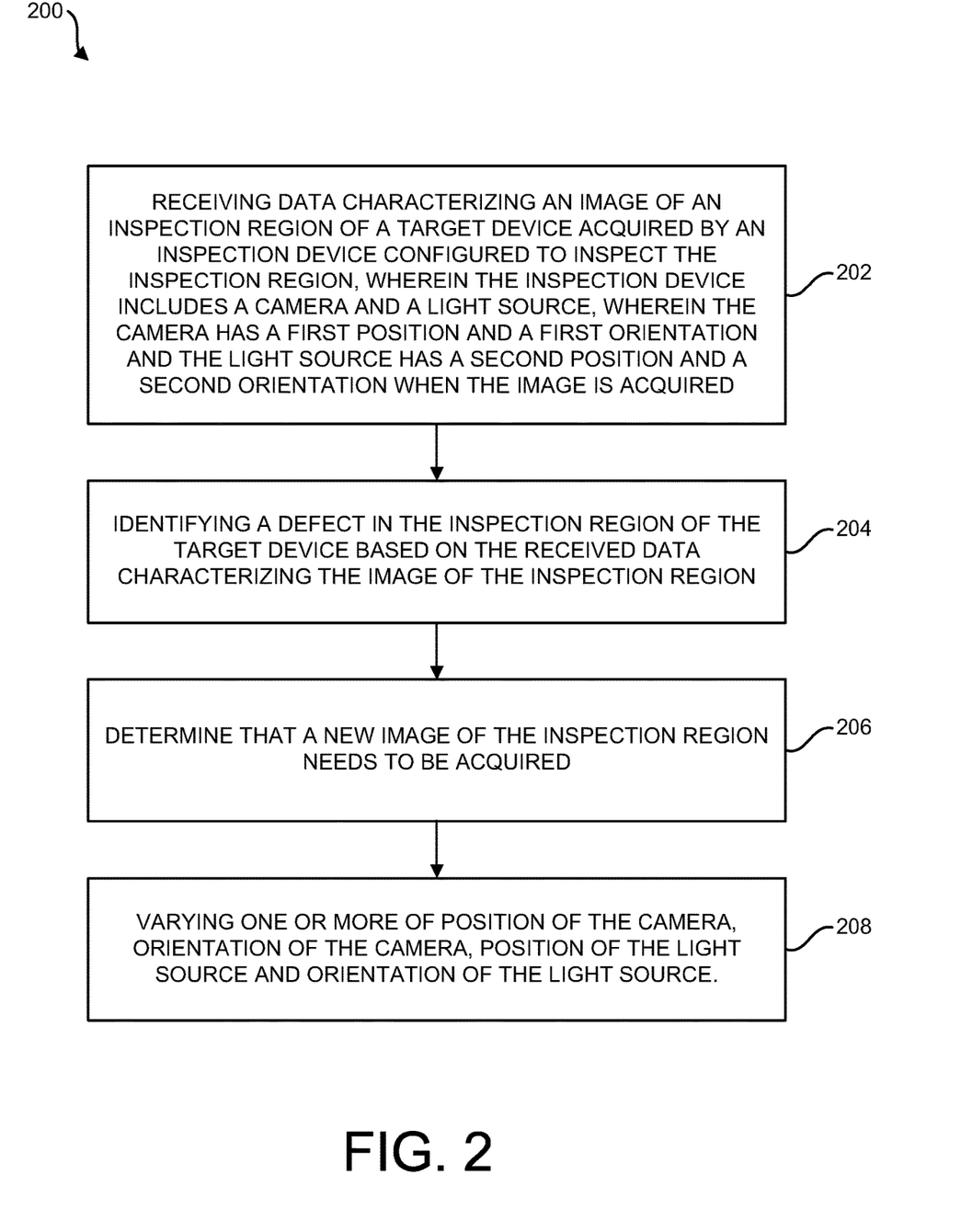
FIG. 2 is a flowchart illustrating an exemplary method for acquiring an image of an inspection region of an industrial machine.

FIG. 2 is a flowchart illustrating an exemplary method of acquiring an image of an inspection region of an industrial machine. At step 202, data characterizing an image of an inspection region of an industrial machine can be received. The inspection region image can be acquired by an inspection device. In one implementation, the inspection device can include a borescope (e.g., borescope 100). The borescope can include a camera (e.g., camera 136) and a light source (e.g., light source 134). The camera can have a first position and a first orientation relative to the industrial machine when the inspection region image is acquired. The light source can have a second position and a second orientation relative to the industrial machine when the inspection region image is acquired.

Figure 3:
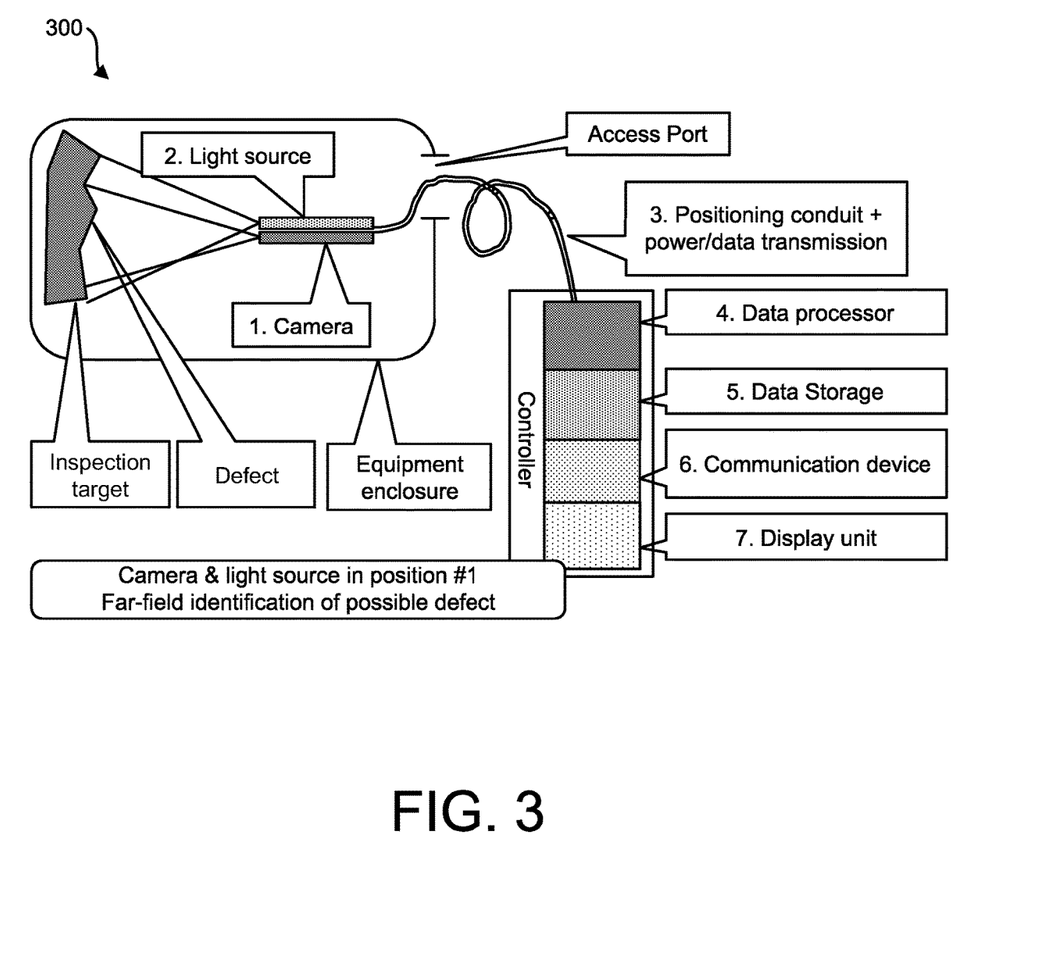
FIG. 3 is an exemplary schematic of a borescope configured for far-field identification of a defect in an industrial machine.

FIG. 3 is an exemplary schematic of a borescope configured for far-field identification of defects in the industrial machine. The borescope is simplified, for the purpose of illustration, to include a head section (e.g., head section 108) comprising a camera (e.g., camera 136), a light source (e.g., light source 134) and a conduit section (e.g., conduit section 104) configured to couple the camera/light source to a controller (e.g., controller 112). The controller can include a data processor, a data storage, a communication device and a display unit. The head section can be navigated into the enclosure (via an access port) of the industrial machine comprising a defect. In the configuration of the head section described in FIG. 3, the head section can be configured to acquire a far-field image of the inspection region (or industrial machine). The image data (e.g., far-field image data) can be communicated to the controller via the conduit section 104.

Returning to FIG. 2, at step 204, the defect in the inspection region can be identified based on the image data. The controller can execute an image interpretation algorithm that can receive the image data as input and determine the identity of the defect. In one implementation, the image interpretation algorithm can determine one or more characteristic of the inspection region image from the image data. For example, the inspection region image can be divided into a plurality of pixels, and each pixel can be assigned one or more numerical values (e.g., based on color of the pixel, light intensity associated with the pixel, etc.). The image interpretation algorithm can generate a database of defect image characteristics from training data that includes images of defects in industrial machines. By comparing the characteristics of the inspection region image with the database of defect image characteristics, the defect in the inspection region can be identified.

At step 206, the image interpretation algorithm can determine the quality of the inspection region image. In some implementations, the image interpretation algorithm can determine the content of the inspection region image. The image interpretation algorithm can include traditional mathematics-based calculations, machine learning, or a combination of both. The image interpretation algorithm can determine a probability value associated with a defect in the inspection region image that can be used for identification of the defect. For example, if the probability value is above a prescribed lower threshold but below a prescribed upper threshold, then a determination can be made that the defect may be present and further inspection is necessary. If the probability value is below the prescribed lower threshold, then the determination can be made that no further inspection is needed within the inspection region or a portion thereof. If the probability value is above the prescribed upper threshold, then the determination is made that the defect exists with a known certainty. Based on the quality of the image of the inspection region, the controller can determine if new inspection region images needs to be acquired. Additionally, the controller can also determine one or more target positions and orientations of the head section or a portion thereof (e.g., camera, light source, etc.) relative to the industrial machine from where the new inspection region images can be acquired. This can be based on, for example, on the probability value (e.g., when the probability value is between the lower threshold value and the upper threshold value). For example, the camera and the light source can be coupled (e.g., via mechanical coupling) and their positions/orientations can be varied in tandem relative to the industrial machine. Alternately, the camera and the light source can move relative to each other and their positions/orientations can be varied independently relative to the industrial machine. The movement of the camera/light source can be based on control signals generated by the controller (based on target orientations and target positions of the head section or a portion thereof determined by the controller), control inputs provided by a user (e.g., directional input 114), etc.

At step 208, one or more of the position and orientation of the camera and/or the light source can be varied (based on target positions and orientations of camera/light source calculated at step 206). The change in the position/orientation of the camera/light source can be achieved by moving (or rotating) the conduit section (e.g., conduit section 104) and/or by bending an articulation section (e.g., articulation section 106) that can vary the angle of the camera/light source. Exemplary translation/rotation of the conduit section and the bending of the articulation section are described above with respect to the embodiment of borescope described in FIG. 1. Steps 202-208 can be repeated (e.g., iteratively) until the image of the defect fulfills one or more predetermined conditions (e.g., has a resolution above a predetermined threshold, is properly illuminated, etc.). If the probability value is above the prescribed upper threshold, then the determination is made that the defect exists with a known certainty, and the inspection process for the given region can be concluded.

Figure 4:
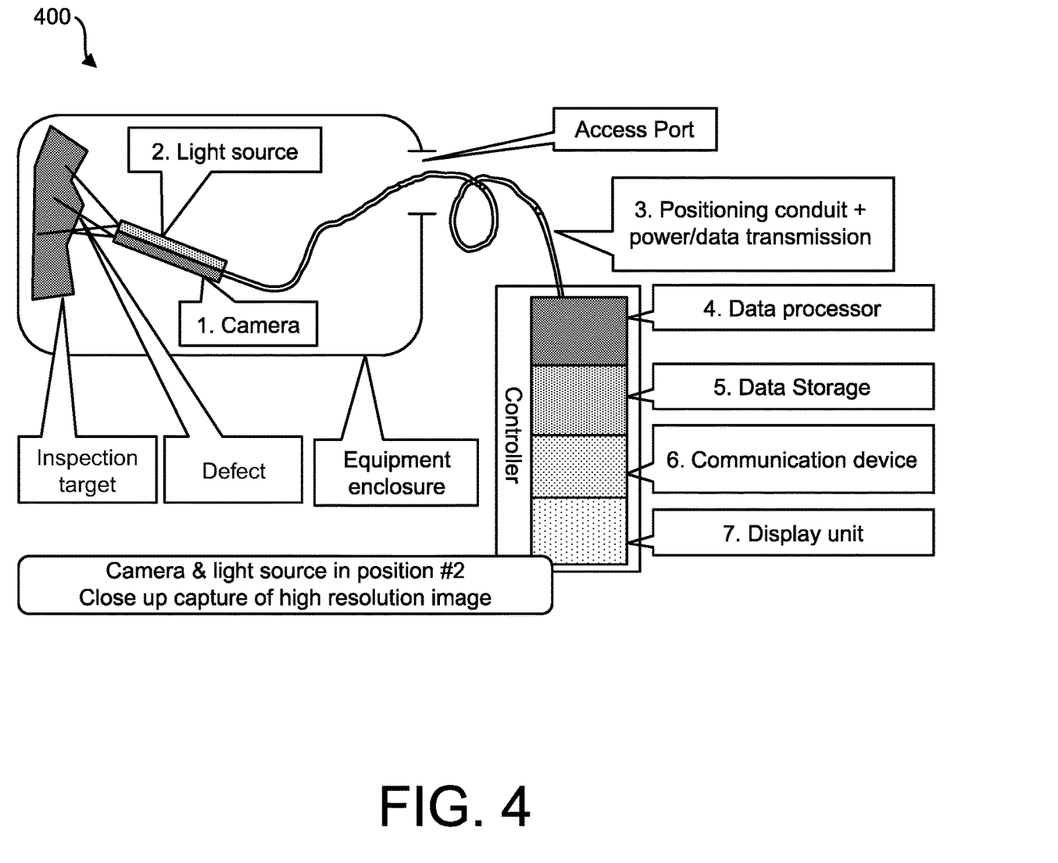
FIG. 4 is an exemplary schematic of a borescope including a head section located proximal to a defect in an industrial machine.

In some implementations, the image of the defect (e.g., in the inspection region image) may not have desirable resolution to identify one or more characteristics of the defect. The controller can determine that the position/orientation of the head section or a portion thereof (e.g., the camera) needs to be changed (e.g., moved closer to the defect), and that the image of the defect (in the inspection region image) needs to be reacquired. FIG. 4 illustrates an exemplary schematic of a borescope where the head section is located proximal to the defect. As discussed above, the head section can be moved/oriented proximal to the defect (e.g., from a previous configuration such as the far-field configuration described in FIG. 3) in order to acquire a high-resolution image of the defect. Additionally or alternatively, the camera can be reconfigured (e.g., focused) to acquire the high-resolution image.

Figure 5:
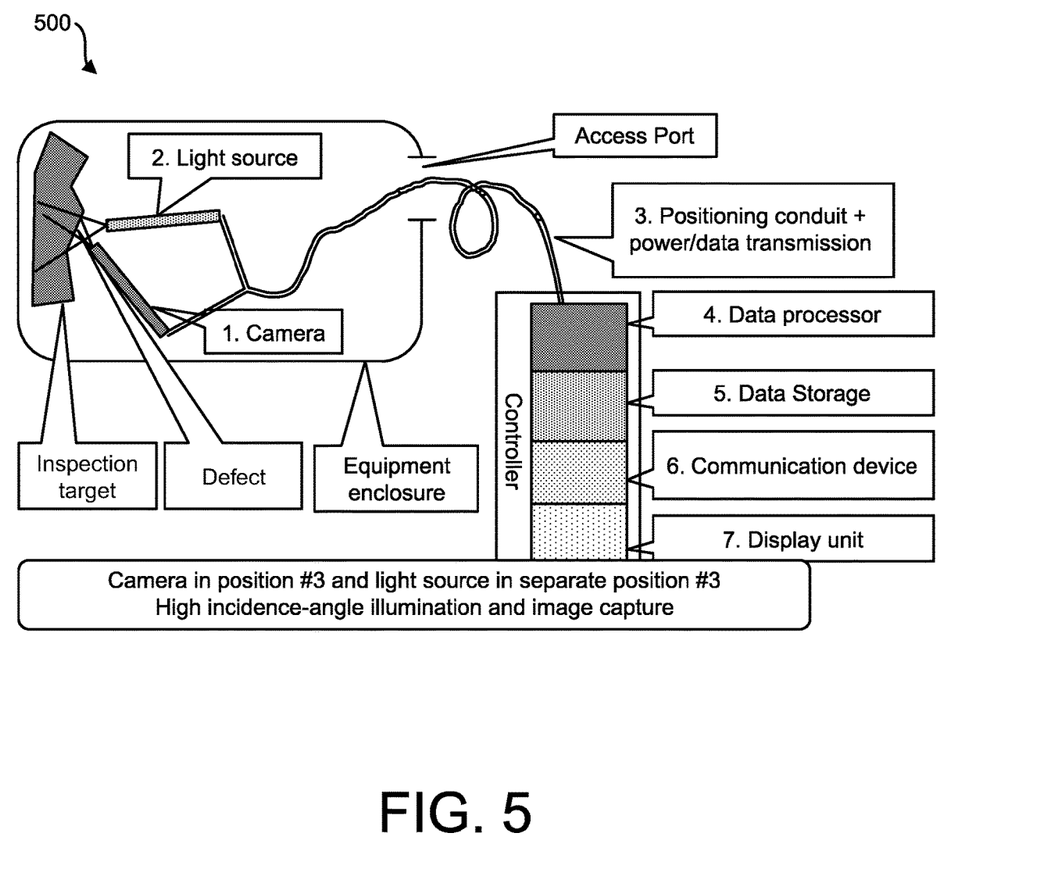
FIG. 5 is an exemplary schematic of a borescope including a camera and a light source and configured to acquire an image using high incidence-angle illumination.

In some implementations, the defect may not be properly illuminated when the initial inspection region image is acquired. The controller can determine that the orientation of the light source needs to be changed. For example, the light source may need to be oriented such that the light beam from the light source impinges the defect at a high incidence-angle. FIG. 5 illustrates an exemplary schematic of a borescope including a camera and a light source and configured to acquire an image using high incidence-angle illumination. The camera and the light source can be decoupled and can move independent of each other. For example, the light source can be positioned/oriented to emit a light beam that impinges the defect at a high incidence-angle, and the camera can be positioned/oriented to acquire the image of the defect illuminated with the high incidence-angle light beam. The camera and the light source can be positioned/oriented (e.g., from a previous configuration such as the far-field configuration described in FIG. 3 or the proximal configuration described in FIG. 4) based on a control signal generated by the controller configured to move/rotate the conduit section and/or rotate the articulation section.

Figure 6:
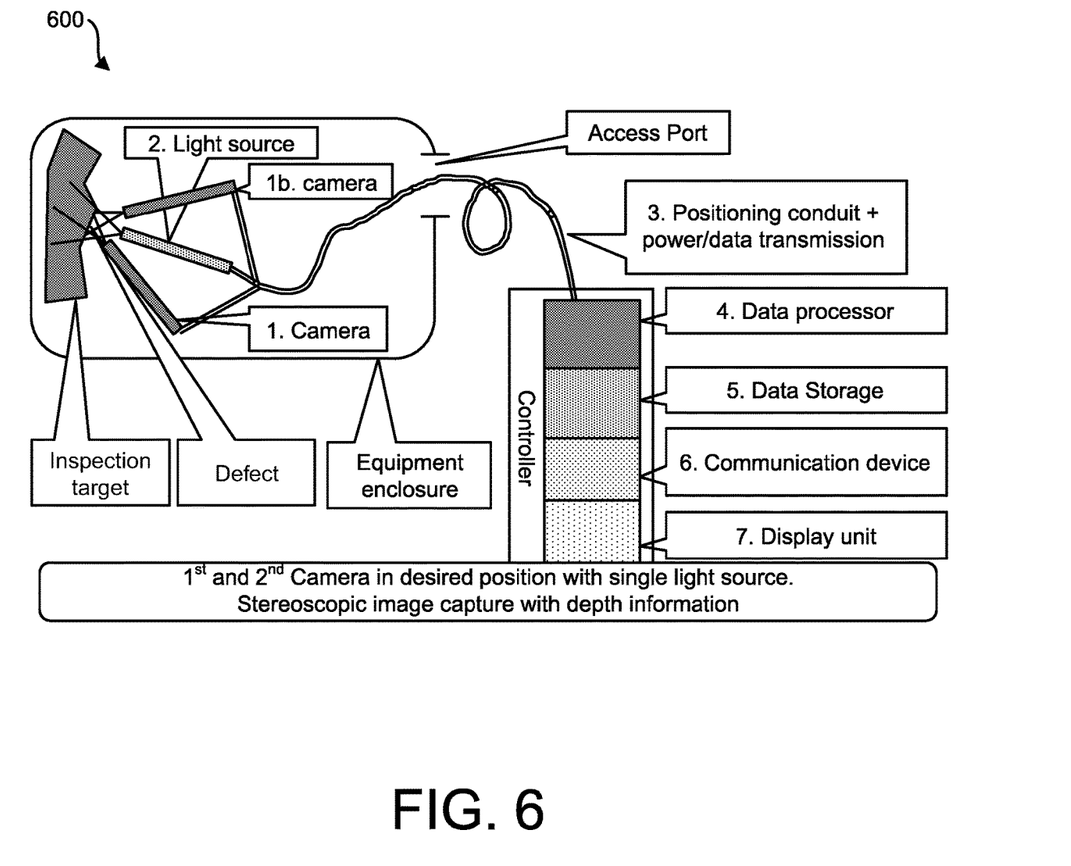
FIG. 6 is an exemplary schematic of a borescope including two cameras and configured to acquire a stereoscopic image in an industrial machine.

In some implementations, a stereoscopic image of the defect may need to be acquired (e.g., to analyze the impact of the defect on the robustness of the industrial machine or a portion thereof). The controller can determine that the initial inspection region image does not sufficiently depict the extension of the defect into the body of the industrial machine (e.g., depth of the defect), and that a stereoscopic image is needed. FIG. 6 illustrates an exemplary schematic of a borescope including two cameras and configured to acquire a stereoscopic image. The light source can be located between the two cameras that are oriented/positioned to acquire the image of the defect from different perspectives. The cameras and the light source can be positioned/oriented (e.g., from a previous configuration such as the far-field configuration described in FIG. 3 or the proximal configuration described in FIG. 4) based on a control signal generated by the controller configured to move/rotate the conduit section and/or rotate the articulation section. The data characterizing the images acquired by the two cameras can be transmitted to the controller that can process the image data to generate a stereoscopic image. The stereoscopic image can be displayed on a display for an operator (e.g., on screen 116).

Figure 7:
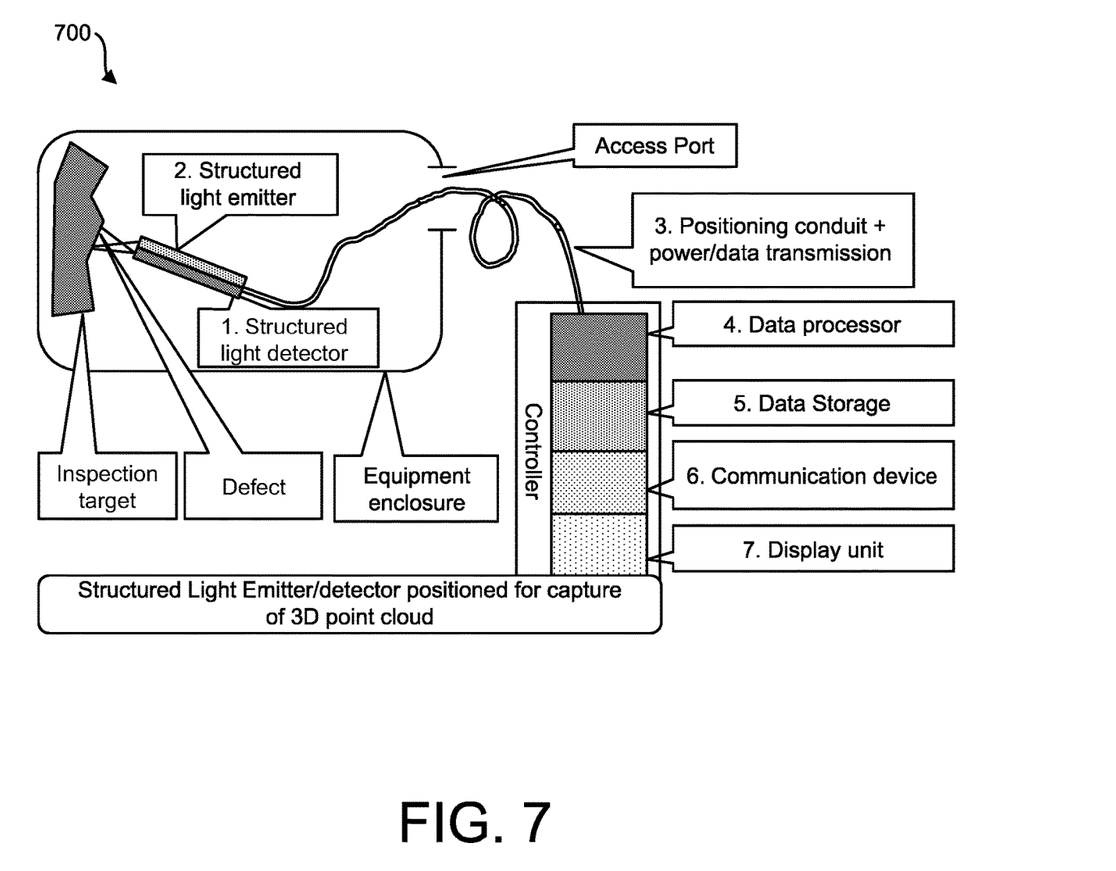
FIG. 7 is an exemplary schematic of a borescope including a structured light emitter and detector and configured to acquire a three-dimensional (3D) point cloud data.

In some implementations, a 3D point cloud data of the inspection region image may need to be acquired (e.g., to generate 3D images of the defect from multiple perspectives, to generate CAD models of the defects, etc.). The controller can determine that the initial inspection region image does not sufficiently depict the details of the defects, and that a 3D point cloud data of the defects is needed. FIG. 7 illustrates an exemplary schematic of a borescope including a structured light emitter and a structured light detector (or camera), and configured to generate 3D point cloud data. The structured light emitter can project light having a predetermined pattern onto a surface of an object that can reflect a portion of the projected light. The reflected light can include information about properties of the object surface (e.g., dimensions of the surface, surface structure, etc.). This information can be represented in a variety of ways (e.g., in the form of grid points with defined three-dimensional coordinates, referred to as a "point cloud"). The 3D point cloud data of the defect can be generated by scanning the defect from multiple perspectives. This can be achieved, for example, by moving the camera (in the head section of the borescope) relative to the defect and capturing multiple images of the defect. The data characterizing the images acquired by the camera can be transmitted to the controller that can compile the multi-perspective image data and generate the 3D point cloud of the defect.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a Read-Only Memory or a Random Access Memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web interface through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:
    receiving data characterizing an image of an inspection region of an industrial machine acquired by an inspection device configured to inspect the inspection region, wherein the inspection device includes a camera and a light source, wherein the camera has a first position and a first orientation and the light source has a second position and a second orientation when the image is acquired;
    identifying a defect in the inspection region of the industrial machine based on the received data characterizing the image of the inspection region, wherein identifying the defect in the inspection region comprises calculating a defect probability value associated with the defect in the inspection region, and wherein the calculation is based on comparison of the data characterizing the image with data characterizing images of inspection regions in a database;
    determining that a new image of the inspection region needs to be acquired, wherein the determination that the new image of the inspection region needs to be acquired is made when the defect probability value is between a first threshold value and second threshold value;
    varying a position of the camera, an orientation of the camera, a position of the light source, and an orientation of the light source by an articulation section of the inspection device driven by a driver that is controlled by a controller responsive to determining that a new image of the inspection region needs to be acquired; and
    acquiring data responsive to determining that a new image of the inspection region needs to be acquired and after varying the position of the camera, the orientation of the camera, the position of the light source, and the orientation of the light source, the data characterizing a 3D point cloud by a structured light emitter and structured light detector or a second image of the inspection region.

2. The method of claim 1, further comprising determining one or more of a first target position of the camera, a first target orientation of the camera, a second target position of the light source and a second target orientation of the light source.

3. The method of claim 2, wherein the position of the camera is varied from the first position to the first target position and/or the orientation of the camera is varied from the first orientation to the first target orientation.

4. The method of claim 2, wherein the position of the light source is varied from the second position to the second target position and/or the orientation of the light source is varied from the second orientation to the second target orientation.

5. A system comprising:
an inspection device comprising a camera and a light source and configured to inspect an inspection region of an industrial machine;
a controller communicatively coupled to the inspection device and configured to:
receive data characterizing an image of the inspection region acquired by the inspection device, wherein the camera has a first position and a first orientation and the light source has a second position and a second orientation when the image of the inspection region is acquired;
identify a defect in the inspection region based on the received data characterizing the image of the inspection region;
execute an image recognition algorithm that determines that a new image of the inspection region needs to be acquired based on a defect probability value, wherein the image recognition algorithm calculates the defect probability value based on comparison of the data characterizing the image with data characterizing images of inspection regions in a database; and
vary one or more of position of the camera, orientation of the camera, position of the light source and orientation of the light source by an articulation section of the inspection device driven by a driver that is controlled by the controller.

6. The system of claim 5, wherein the controller is configured to determine one or more of a first target position of the camera, a first target orientation of the camera, a second target position of the light source and a second target orientation of the light source.

7. The system of claim 6, wherein the position of the camera is varied from the first position to the first target position and/or the orientation of the camera is varied from the first orientation to the first target orientation.

8. The system of claim 6, wherein the position of the light source is varied from the second position to the second target position and/or the orientation of the light source is varied from the second orientation to the second target orientation.

9. A system comprising:
at least one data processor; and
memory coupled to the at least one data processor, the memory storing instructions to cause the at least one data processor to perform operations comprising:
receiving data characterizing an image of an inspection region of an industrial machine acquired by an inspection device configured to inspect the inspection region, wherein the inspection device includes a camera and a light source, wherein the camera has a first position and a first orientation and the light source has a second position and a second orientation when the image is acquired;
identifying a defect in the inspection region of the industrial machine based on the received data characterizing the image of the inspection region, wherein identifying the defect in the inspection region comprises calculating a defect probability value associated with the defect in the inspection region, wherein the calculation is based on comparison of the data characterizing the image with data characterizing images of inspection regions in a database;
determining that a new image of the inspection region needs to be acquired, wherein the determining that the new image of the inspection region needs to be acquired is made when the defect probability value is between a first threshold value and second threshold value; and
varying a position of the camera, an orientation of the camera, a position of the light source, and an orientation of the light source by an articulation section of the inspection device driven by a driver.

10. The system of claim 9, wherein the operations further comprising determining one or more of a first target position of the camera, a first target orientation of the camera, a second target position of the light source and a second target orientation of the light source.

11. The system of claim 10, wherein the position of the camera is varied from the first position to the first target position and/or the orientation of the camera is varied from the first orientation to the first target orientation.

12. The system of claim 10, wherein the position of the light source is varied from the second position to the second target position and/or the orientation of the light source is varied from the second orientation to the second target orientation.

13. A computer program product comprising a non-transitory machine-readable medium storing instructions that, when executed by at least one programmable processor that comprises at least one physical core and a plurality of logical cores, cause the at least one programmable processor to perform operations comprising:
receiving data characterizing a first image of an inspection region of an industrial machine acquired by an inspection device configured to inspect the inspection region, wherein the inspection device includes a camera and a light source, wherein the camera has a first position and a first orientation and the light source has a second position and a second orientation when the image is acquired;
identifying a defect in the inspection region of the industrial machine based on the received data characterizing the image of the inspection region, wherein identifying the defect in the inspection region comprises calculating a defect probability value associated with the defect in the inspection region, wherein the calculation is based on comparison of the data characterizing the image with data characterizing images of inspection regions in a database;
determining that a new image of the inspection region needs to be acquired, wherein the determining that the new image of the inspection region needs to be acquired is made when the defect probability value is between a first threshold value and second threshold value;
varying a position of the camera, an orientation of the camera, a position of the light source, and an orientation of the light source by an articulation section of an inspection device driven by a driver; and receiving data characterizing a second image of the inspection region from the camera when the camera is at a third position and a third orientation and while the light source is at a fourth position and a fourth orientation.

* * * * *